United States Patent
Malladi

(10) Patent No.: US 8,213,483 B2
(45) Date of Patent: Jul. 3, 2012

(54) HOPPING STRUCTURES FOR BROADBAND PILOT SIGNALS

(75) Inventor: Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1056 days.

(21) Appl. No.: 12/026,501

(22) Filed: Feb. 5, 2008

(65) Prior Publication Data

US 2008/0187027 A1 Aug. 7, 2008

Related U.S. Application Data

(60) Provisional application No. 60/888,460, filed on Feb. 6, 2007.

(51) Int. Cl.
H04B 1/713 (2006.01)
H04B 1/76 (2006.01)

(52) U.S. Cl. .......... 375/135; 375/136; 375/138

(58) Field of Classification Search .......... 375/132, 375/133, 135, 136, 138, 260, 262, 265, 267; 370/208
See application file for complete search history.

(56) References Cited

U.S. PATENT DOCUMENTS

| | | |
|---|---|---|
| 2005/0226141 A1 | 10/2005 | Ro et al. |
| 2005/0281188 A1 | 12/2005 | Cho et al. |
| 2006/0146760 A1 | 7/2006 | Khandekar et al. |
| 2006/0209670 A1 | 9/2006 | Gorokhov et al. |
| 2006/0215603 A1* | 9/2006 | Nishio et al. .......... 370/329 |
| 2006/0268675 A1 | 11/2006 | Cho et al. |
| 2006/0274679 A1* | 12/2006 | Khandekar et al. .......... 370/278 |
| 2007/0133462 A1* | 6/2007 | Guey .......... 370/330 |
| 2007/0248147 A1* | 10/2007 | Tiirola et al. .......... 375/135 |
| 2008/0198902 A1* | 8/2008 | Malladi .......... 375/134 |
| 2010/0240379 A1* | 9/2010 | Kishiyama et al. .......... 455/450 |

FOREIGN PATENT DOCUMENTS

| | | |
|---|---|---|
| JP | 08015417 | 1/1996 |
| WO | WO2004102816 A2 | 11/2004 |
| WO | WO2005060108 A2 | 6/2005 |
| WO | WO2006069401 | 6/2006 |

OTHER PUBLICATIONS

International Search Report, PCT/US08/053217, International Search Authority, European Patent Office, Jul. 14, 2008.
Written Opinion, PCT/US08/053217, International Search Authority, European Patent Office, Jul. 14, 2008.
Nokia, "UL Reference Signal Structure," 3GPP TSG RAN WG1 AD HOC, R1-061910, Cannes, France, Jun. 27-30, 2006, pp. 1-7, XP002485860.

(Continued)

*Primary Examiner* — Young T. Tse
(74) *Attorney, Agent, or Firm* — Peng Zhu

(57) ABSTRACT

Systems and methodologies are described that facilitate defining and utilizing hopping patterns to transmit broadband pilot signals in a wireless communications network. Portions of bandwidth can be dedicated to transmitting the broadband pilot data, and patterns can be utilized to hop across frequencies in given time periods to effectively utilize the entire dedicated bandwidth. Moreover, the periodicity for transmitting the data is configurable to allow devices requiring additional scheduling (e.g., high activity devices) to transmit the broadband pilot data more frequently. The hopping patterns can also hop across cyclic shifts of the patterns to provide optimum diversity for transmitting broadband pilot signals.

42 Claims, 11 Drawing Sheets

OTHER PUBLICATIONS

NEC Group, "Performance of CAZAC pilot sequence for D-FDMA and L-FDMA with Frequency Hopping for EUTRA Uplink," TSG-RAN WG1 LTE AD HOC, R1-060060, Helsinki, Finland, Jan. 23-25, 2006, pp. 1-7, XP002485861.

Qualcomm Europe, "CDM RS for Demodulation and Channel Sounding," 3GPP TSG RAN1 #48, R1-070653, St. Louis, MO, USA, Feb. 16, 2007, pp. 1-7, XP002485862.

Taiwan Search Report—TW097104881—TIPO—May 31, 2011.

* cited by examiner

HOPPING STRUCTURES FOR BROADBAND PILOT SIGNALS

CROSS-REFERENCE TO RELATED APPLICATIONS

This application claims the benefit of U.S. Provisional Patent application Ser. No. 60/888,460 entitled "A METHOD AND APPARATUS FOR UPLINK CHANNEL SOUNDING AND POWER CONTROL" which was filed Feb. 6, 2007. The entirety of the aforementioned application is herein incorporated by reference.

BACKGROUND

I. Field

The following description relates generally to wireless communications, and more particularly to frequency, time slot, and cyclic shift hopping for broadband pilot channels.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennae can relate to both base stations and mobile devices, in one example, allowing bi-directional communication between the devices on the wireless network. With many devices transmitting signal data in proximity, resource allocation and power control are important for devices to ensure sufficient signal-noise ratio and data rate in communications. Thus, broadband pilot signals can be sent by devices allowing measurement of signal quality in transmission that can be utilized to allocate additional resources and/or request additional power in subsequent transmissions.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating generating and utilizing hopping patterns to transmit broadband pilot signals. In utilizing hopping patterns, entire portions of bandwidth dedicated to transmitting broadband pilot signals can be utilized by hopping within the bandwidth over time. Furthermore, the hopping patterns can be of different periodicity, such that devices having high scheduling needs can be assigned a pattern that provides for transmitting broadband pilot data frequently (e.g., at every opportunity) while devices having lower scheduling needs, or lower activity levels, can be assigned patterns that do not necessarily transmit at each available interval.

According to related aspects, a method for defining a broadband pilot signal hopping pattern in a wireless communications network is provided. The method can comprise reserving a portion of available bandwidth for transmitting broadband pilot data and generating a broadband pilot signal hopping pattern for a device that specifies hopping across one or more frequency resource blocks of the reserved portion of bandwidth according to a configured periodicity for the device. The method also includes assigning the hopping pattern to the device.

Another aspect relates to a wireless communications apparatus. The wireless communications apparatus can include at least one processor configured to assign a broadband pilot signal hopping pattern to a device that hops in time across a plurality of frequency resource blocks of a portion of bandwidth reserved for transmitting broadband pilot signals. The wireless communications apparatus can also include a memory coupled to the at least one processor.

Yet another aspect relates to a wireless communications apparatus that creates hopping patterns for broadband pilot signal transmissions. The wireless communications apparatus can include means for determining a portion of bandwidth dedicated to communicating broadband pilot signals and means for generating a broadband pilot signal hopping pattern that specifies hopping to disparate frequency resource blocks of the portion of bandwidth over time. The wireless communications apparatus can further include means for assigning the broadband pilot signal hopping pattern to a device based at least in part on an activity level of the device.

Still another aspect relates to a computer program product, which can have a computer-readable medium including code for causing at least one computer to reserve a portion of available bandwidth for transmitting broadband pilot data. The computer-readable medium can further comprise code for causing the at least one computer to generate a broadband pilot signal hopping pattern for a device that specifies hopping across one or more frequency resource blocks of the reserved portion of bandwidth according to a configured periodicity for the device. Moreover, the computer-readable medium can include code for causing the at least one computer to assign the hopping pattern to the device.

In accordance with another aspect, an apparatus in a wireless communication system can include a processor configured to determine a portion of bandwidth dedicated to communicating broadband pilot signals. The processor can further be configured to generate a broadband pilot signal hopping pattern that specifies hopping to disparate frequency resource blocks of the portion of bandwidth over time and assign the broadband pilot signal hopping pattern to a device based at least in part on an activity level of the device. Also, the apparatus can include a memory coupled to the processor.

According to a further aspect, a method for communicating broadband pilot signals is provided. The method can comprise transmitting broadband pilot data in a first frequency resource block of a portion of bandwidth, the portion of bandwidth reserved for broadband pilot signals. Moreover, the method can include hopping to a second frequency resource block of a portion of bandwidth reserved for broadband pilot signals in a disparate portion of bandwidth according to a broadband pilot signal hopping pattern and transmitting broadband pilot data in the second frequency resource block.

Another aspect relates to a wireless communications apparatus. The wireless communications apparatus can include at least one processor configured to hop between a plurality of frequency resource blocks over time to transmit broadband pilot signals over portions of bandwidth reserved for transmitting the broadband pilot signals. The wireless communications apparatus can also include a memory coupled to the at least one processor.

Yet another aspect relates to a wireless communications apparatus for transmitting broadband pilot signals. The wireless communications apparatus can comprise means for receiving a broadband pilot signal hopping pattern, means for generating broadband pilot signals, and means for transmitting the broadband pilot signals over time according to the received broadband pilot signal hopping pattern.

Still another aspect relates to a computer program product, which can have a computer-readable medium including code for causing at least one computer to transmit broadband pilot data in a first frequency resource block of a portion of bandwidth, the portion of bandwidth reserved for broadband pilot signals. The computer-readable medium can also include code for causing the at least one computer to hop to a second frequency resource block of a portion of bandwidth reserved for broadband pilot signals in a disparate portion of bandwidth according to a broadband pilot signal hopping pattern. Furthermore, the computer-readable medium can comprise code for causing the at least one computer to transmit broadband pilot data in the second frequency resource block.

In accordance with another aspect, an apparatus can be provided in a wireless communication system including a processor configured to receive a broadband pilot signal hopping pattern, generate broadband pilot signals, and transmit the broadband pilot signals over time according to the received broadband pilot signal hopping pattern. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
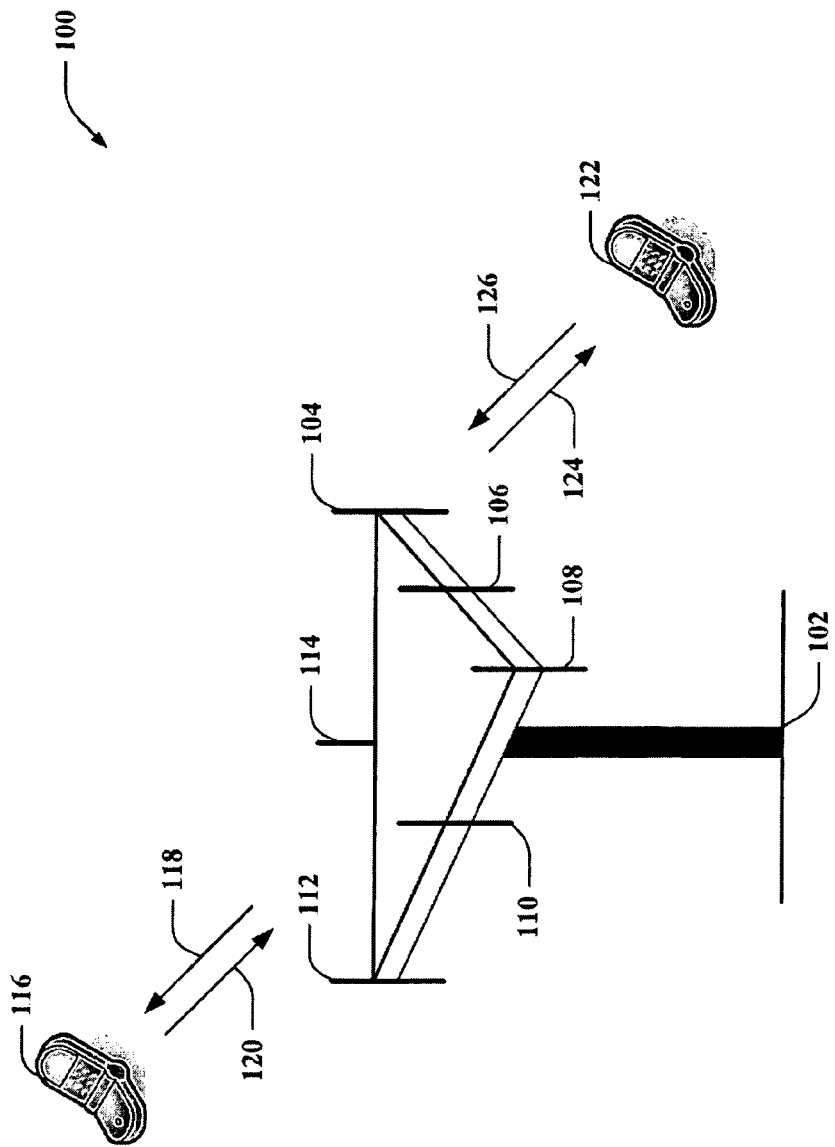
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set fourth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology as depicted.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In one example, system 100 can dedicate a portion of bandwidth for transmitting broadband pilot signals. For instance, one or more mobile devices 116 and/or 122 can transmit a respective broadband pilot signal within the portion of bandwidth according to one or more hopping patterns, which can include hopping across time, frequency, cyclic shifts in time or frequency, etc. In this regard, the hopping patterns can effectively utilize the dedicated broadband pilot portion of the bandwidth; the portion of the bandwidth can be relatively small to promote high data throughput.

In an example, a wireless communications network configuration using OFDM symbols for communicating frequency over time (such as third generation partnership project (3GPP), 3GPP long term evolution (LTE), and the like, in one example), can dedicate one or more OFDM symbols in a given time period for transmitting broadband pilot signals. In one example, the dedicated symbol can be a similarly positioned symbol in each time period; however, it is to be appreciated that symbols of disparate positions can be chosen as well to provide further diversity. Broadband pilot signal hopping patterns can be assigned to mobile devices 116 and 122, by the base station 102 for example, where the hopping pattern can specify slots or frequencies of the OFDM symbol to utilize for transmitting broadband pilot information over one or more time periods. The hopping patterns can be based at least in part on an activity level for the given mobile device 116 and/or 122 and can include hopping across frequencies with respect to the dedicated broadband pilot OFDM symbols. For example, a high activity mobile device can transmit broadband pilot information more frequently, and therefore hop more frequently, than a lower powered mobile device. Moreover, a cyclic shift can be specified related to a given hopping pattern, and the cyclic shifts can be hopped as well. Also, hopping patterns can be specific to a given base station 102.

In another example, information transmitted in the broadband pilot signal can be utilized to implement frequency selective scheduling for respective mobile device 116 and/or 122 communication with the base station 102. In this regard, portions of bandwidth (e.g., OFDM symbols or portions thereof) can be allocated to mobile devices 116 and/or 122 based on the broadband pilot information to achieve desired signal-to-noise ratio (SNR) and/or a desired or maximum data rate on a communications channel. Moreover, the broadband pilot information can be used to send power control information from the base station 102 to the mobile devices 116 and/or 122. For example, based on the information received in the broadband pilot and/or a strength, clarity, or quality of the communication, the base station 102 can send a power-up or power-down command to maximize data throughput while minimizing interference, for example. It is to be appreciated that not all mobile devices communicating with base station 102 need be scheduled or assigned a hopping pattern or frequency slot for transmitting broadband pilot data. In one example, mobile devices can be scheduled or not scheduled based on an activity level or state of the device. For example, where a device is in a sufficiently active state, broadband pilot hopping patterns can be assigned to the device to facilitate frequency selective scheduling thereof; however, a device not in a sufficiently active state (e.g., a device merely active enough to maintain a media access control (MAC) address) may not need to transmit broadband pilot information, and therefore may not need to be assigned a hopping pattern for such pilot information.

Figure 2:
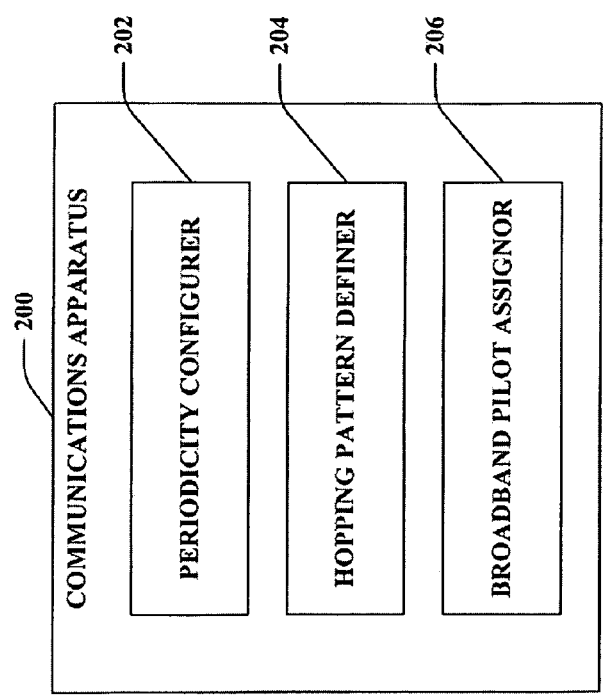
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. Receiving data transmitted by a plurality of devices can result in interference or overlap of signals; thus, the communications apparatus 200 can employ components described below to schedule communication with the plurality of devices using minimal bandwidth to do so. The communications apparatus 200 can include a periodicity configurer 202 that can configure a broadband pilot periodicity to be utilized by a device, a hopping pattern definer 204 that can determine a hopping pattern for a broadband pilot for a device, and a broadband pilot assignor 206 that can assign a resulting broadband pilot configuration to a representative device.

According to an example, the communications apparatus 200 can detect a transmitting presence of a disparate device. This can occur, for example, as a request from the device to communicate with the communications apparatus 200, a pilot signal broadcast by the disparate device, detection of communication of the device with another device, a notification from another communications apparatus, etc. The periodicity configurer 202 can determine an activity state or level of the disparate device, which can relate to scheduling needs of the device with respect to communicating with the communications apparatus 200. It is to be appreciated that devices having high transmission activity can require more scheduling than those having low transmission activity. Thus, the periodicity configurer 202 can configure a higher periodicity with respect to broadband pilot transmission for the device. For example, for a highly active device the periodicity configurer 202 can assign 200 Hz periodicity (e.g., a 5 ms sounding period for sounding over a 20 MHz bandwidth) for transmitting broadband pilot data whereas a device that is not so active can be assigned a 25 Hz periodicity (e.g., a 40 ms sounding period for sounding over a 20 MHz bandwidth). The hopping pattern definer 204 can utilize the periodicity in defining a broadband pilot bopping pattern for the device.

In an example, the hopping pattern definer 204 can generate a broadband pilot hopping pattern for a device that can hop across time, frequency, and/or cyclic shifts of time/frequency as described herein. A broadband pilot hopping pattern can be based at least in part on patterns defined for disparate devices, for example, to prevent overlap or interference on a broadband pilot channel. For example, as described in an OFDM configuration, one or more OFDM symbols of a given time period can be dedicated to broadband pilot transmission such that other communication can be forbidden on the OFDM symbol. The symbols can be divided into time periods of multiple symbols such that the broadband pilot dedicated OFDM symbol can exist in each time period. In this regard, the broadband pilots can hop across time to the different OFDM symbols. Moreover, within the OFDM symbol dedicated to broadband pilots, the hopping pattern definer 204 can schedule broadband pilot data for a plurality of devices among divided frequency slots of the OFDM symbols, thus minimizing conflict/collision. To this end, the devices transmitting broadband pilots can hop across the frequency slots of the OFDM symbol in or over the given time periods to provide diversity for the broadband pilots, for example. Additionally, where the hopping pattern definer 204 defines one or more hopping patterns that can be utilized by devices, the hopping patterns can be cyclically shifted for a given device such that it can utilize a given pattern, but start at a disparate slot or frequency of the OFDM symbols. The hopping pattern definer 204 can also define patterns that hop between the cyclic shifts for given time periods as described herein.

Upon determining a hopping pattern for a device, the broadband pilot assignor 206 can assign the broadband pilot hopping pattern to the device; this can include sending the device the hopping pattern information. In this way, the device can send, and the communications apparatus 200 can receive, broadband pilot signals from the device according to the hopping pattern. The hopping patterns can be specific to the communications apparatus 200 and can vary for each device. As mentioned, the patterns can be based on an activity level of a given device. Thus, different devices can have different sounding periods for the broadband pilot information based on the activity level. Accordingly, the communications apparatus 200 can define the hopping patterns by evaluating current hopping patterns and generating a pattern for a device that maximizes throughput and efficiency as described infra.

Figure 3:
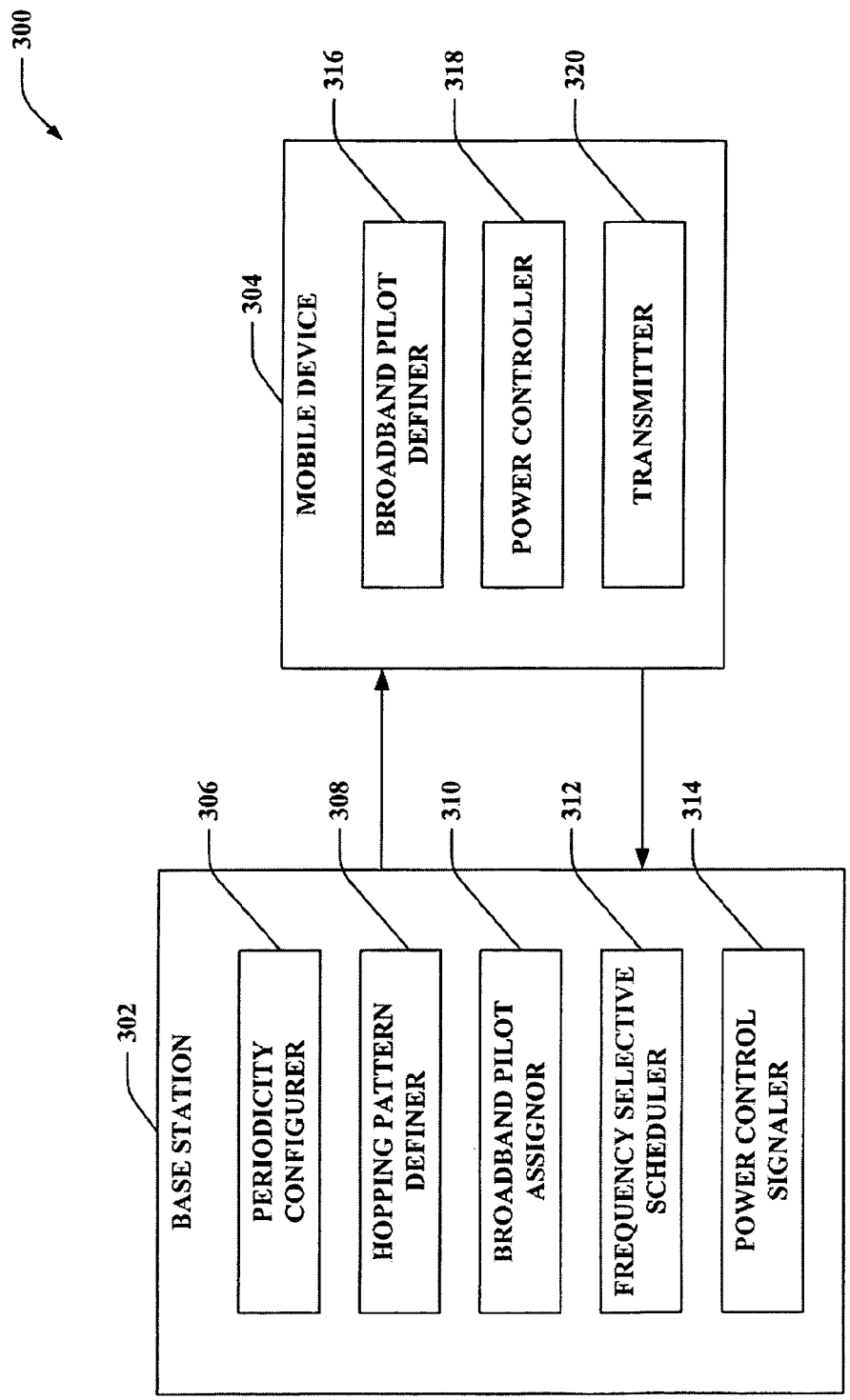
FIG. 3 is an illustration of an example wireless communications system that generates hopping patterns for broadband pilot signal transmission.

Now referring to FIG. 3, illustrated is a wireless communications system 300 that can generate broadband pilot signal hopping patterns for subsequent use in transmitting broadband pilot signals. The system 300 includes a base station 302 that communicates with a mobile device 304 (and/or any number of disparate mobile devices (not shown)). Base station 302 can transmit information to mobile device 304 over a forward link channel; further base station 302 can receive information from mobile device 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes a periodicity configurer 306 that can determine a periodicity for transmitting broadband pilot data for a device, for example, based on an activity level or scheduling needs, a hopping pattern definer 308 that can generate a hopping pattern for a device based at least in part on the determined periodicity, and a broadband pilot assignor 310 that can assign a broadband pilot hopping pattern to a device. Additionally, the base station 302 can include a frequency selective scheduler 312 that can allocate communications resources to devices, such as mobile device 304, based on received broadband pilot signals and a power control signaler 314 that can transmit power control signals to a device based on received broadband pilot signals.

Mobile device 304 includes a broadband pilot definer 316 that can define broadband pilot data to transmit according to a received broadband pilot signal hopping pattern and a power controller 318 that can control power for signals transmitted by the transmitter 320. In one example, the mobile device 304 can receive power control signals from the base station 302 based at least in part on broadband pilot signals sent thereto and can utilize the power controller 318 to control power for subsequent transmissions based on the received power control signals.

According to an example, the base station 302 can detect presence of the mobile device 304, such as by receiving a communication or pilot, intercepting a communication, receiving communication from another device indicating the presence of the mobile device 304, etc. Subsequently, scheduling needs and/or an activity level of the mobile device 304 can be discerned, and the periodicity configurer 306 can utilize this information to determine a periodicity to utilize for transmitting broadband pilot data. The hopping pattern definer 308 can define a hopping pattern, according to the periodicity, to utilize in transmitting broadband pilot data for the mobile device 304. The hopping pattern can be generated as described herein including hopping across time, frequency, and/or cyclic shifts of frequency/time. According to one example, the hopping pattern can be defined based on other hopping patterns generated for disparate devices to minimize conflict and interference. The broadband pilot assignor 310 can assign and transmit the hopping pattern to the device for utilization thereof in transmitting the broadband pilot data.

The mobile device 304 upon receiving the hopping pattern can utilize the pattern to transmit broadband pilot signals to the base station 302. For example, the broadband pilot definer 316 can create broadband pilot data to allow the base station 302 to schedule resources and/or transmit power control commands to the mobile device 304. In this regard, the broadband pilot data can comprise substantially any data to achieve this end, such as data bits, structures, commands, variables, etc. The broadband pilot definer 316 can schedule the broadband pilot data to be transmitted over the frequency and time specified in the hopping pattern. In this way, the base station 302 can know when to expect broadband pilot data from the mobile device 304. Upon receiving broadband pilot data, the base station 302 can utilize the frequency selective scheduler 312 to allocate communications resources to the mobile device 302; this can be based on an activity level or other data determined from the broadband pilot signal, for example. Additionally, the power control signaler 314 can be utilized to issue power-up and/or power-down commands to the mobile device 304 to request an increase or decrease in power for subsequent transmissions. This can be to ensure reliable communication while reducing interference, for example. Upon receiving such commands, the power controller 318 can adjust the power for subsequent transmissions by the transmitter 320. For example, this can include setting a power level and/or adjusting a current level according to the power control commands, etc.

Figure 4:
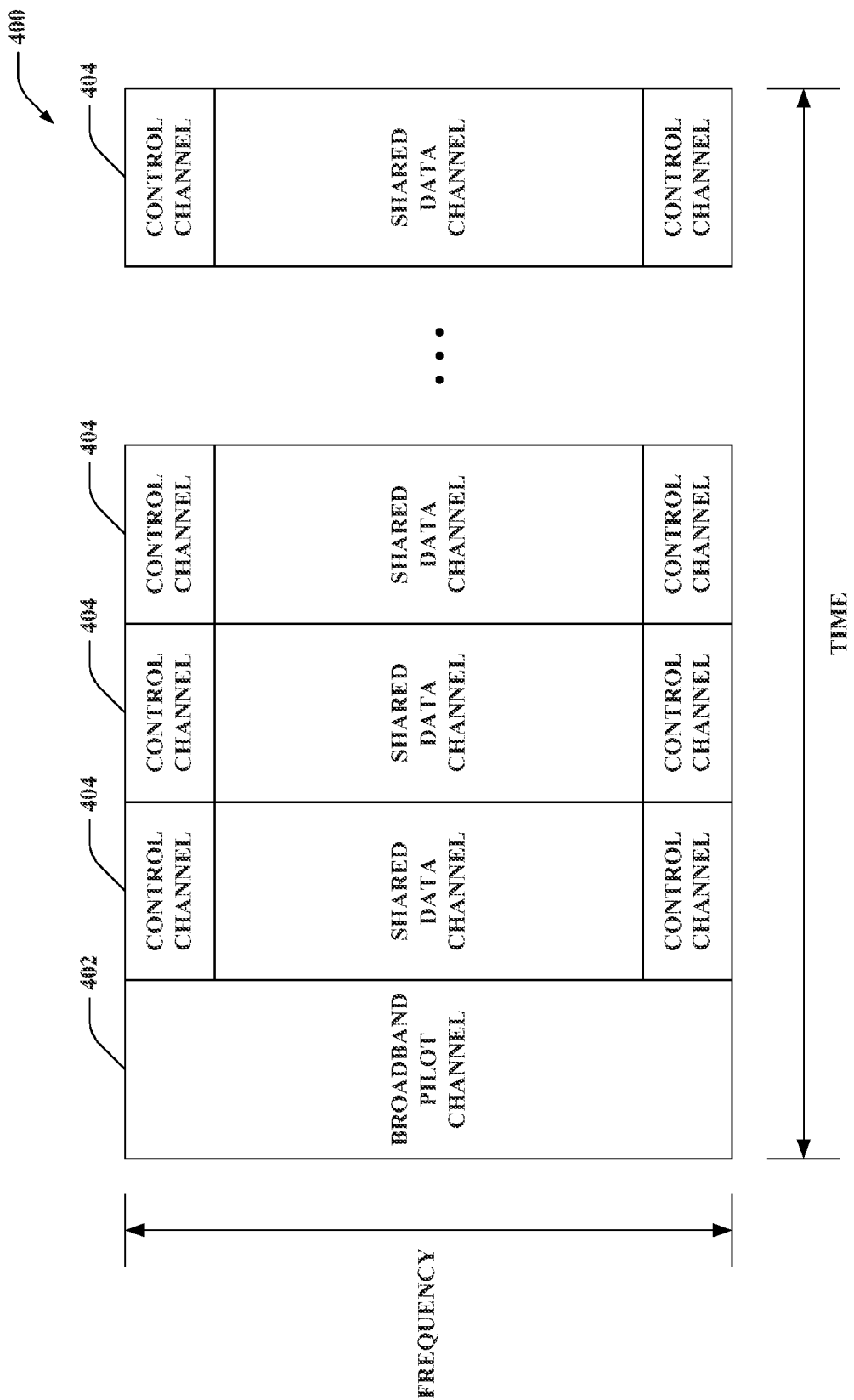
FIG. 4 is an illustration of example bandwidth having reserved sections for transmitting broadband pilot signals.

Now referring to FIG. 4, a sample portion of bandwidth is shown represented as a plurality of time slots spanning a frequency; in one example, this can be a plurality of OFDM symbols 402, 404 (such as in a 3GPP or 3GPP LTE configuration, for example). As described previously, a portion of bandwidth can be reserved in a given time period for transmitting broadband pilot data. In this example, OFDM symbol 402 can be utilized to transmit such data. The other OFDM symbols 404 can be utilized for transmitting substantive data, control data (as shown), and/or substantially any other data. The sample shown can be repeated over time, for instance. In one example, the sample portion can be repeated every n milliseconds such that the broadband pilot channel is transmitted in each time slot (once every n milliseconds) followed by additional data. It is to be appreciated that not all devices transmitting broadband pilot data need to transmit such data in each time slot; rather, as described, devices can be assigned a periodicity for transmission based at least in part on scheduling needs and/or an activity level of the device.

According to an example, the bandwidth shown 400 can be across 0.5 ms in a 3GPP LTE configuration, for example, spanning a given frequency. Thus, there can be n OFDM symbols 402, 404 transmitted in 0.5 ms where one OFDM symbol 402 is dedicated to transmission of broadband pilot data, and the remaining n−1 OFDM symbols 404 are for transmitting additional data (shared data and control data). Devices having sufficient activity can be scheduled to transmit broadband pilot information; moreover, the devices can be assigned hopping patterns based at least in part on an activity level. The hopping pattern can specify when and where broadband pilot information is to be transmitted by a device. For example, in one instance, a device can require broadband pilot information transmission at 25 Hz, 50 Hz, 100 Hz, or 200 Hz, depending on the activity level. Additionally, the broadband pilot channel 402 can allow broadband pilot data to be multiplexed throughout the channel in 1 MHz resource blocks. In this regard, a device requiring 200 Hz periodicity for transmitting broadband pilot data can be assigned a hopping pattern transmitting data at every time slot (every 0.5 ms in this example). Conversely, a device requiring only 25 Hz periodicity for transmitting broadband pilot data can be assigned a hopping pattern transmitting data at every eighth time slot (every 4.0 ms in this example). In this way, the devices can be assigned hopping patterns to minimize collision and interference by evaluating other assigned hopping patterns.

As described previously, a hopping pattern can additionally specify hopping across frequencies at each time period. For example, the pattern can specify to sequentially hop across the 1 MHz resource blocks each time period or substantially any hopping pattern. Moreover, the hopping pattern can specify to use one or more cyclic shifts of hopping patterns and to hop across the cyclic shifts. For example, the pattern can specify to hop sequentially across the 1 MHz resource blocks beginning at the first available resource block and ending at the edge of the available bandwidth; on the next round, a cyclic shift can be used to instead begin at the second available resource block and sequentially hop to the last available resource block ending with the first available, then hopping the cyclic shift to begin with the third available resource block and so on.

For example, the available frequency can be 20 MHz, the devices requiring hopping patterns can hop across 1 MHz resource blocks, and the time slots can be 0.5 ms (such that the broadband pilot channel 402 occurs every 0.5 ms). In this regard, a 200 Hz device can transmit broadband pilot information at the broadband pilot channel 402 in each time slot. A sounding period can be defined as the time it takes for the device to utilize the entire bandwidth of the broadband pilot channel 402. In this example, the hopping pattern for the device can specify to hop each 1 MHz resource block of the 20 MHz broadband pilot channel 402 at every time slot, rendering a 10 ms sounding period. Thus, at time slot 0, the device can transmit at resource block 0; at time slot 1, the device can transmit at resource block 1, all the way up to 20. Therefore, it can take 20 time slots before the entire bandwidth is utilized for transmitting broadband pilot data, which is 10 ms at 0.5 ms per slot. As another example, a 100 Hz device can have a sounding period of 20 ms. Since broadband pilot data need only be sent every two time slots (or 1 ms), the 20 resource blocks can be hopped each at 1 ms yielding the 20 ms sounding period.

Moreover, patterns can be hopped; in one example, a pattern can specify to begin at a first available resource block and hop at each time slot to the next sequential resource block until the edge of bandwidth is reached. Then a second pattern can be hopped to that specifies beginning at the edge and sequentially hopping the opposite direction until the first available resource block is reached. It is to be appreciated that substantially any combination of the foregoing can be utilized as well (e.g., sequential until all cyclic shifts have been hopped, then reverse sequential hopping cyclic shifts at each time slot, etc.). It is to be appreciated that the hopping patterns can be cell or base station specific to minimize colliding transmissions or interference.

Figure 5:
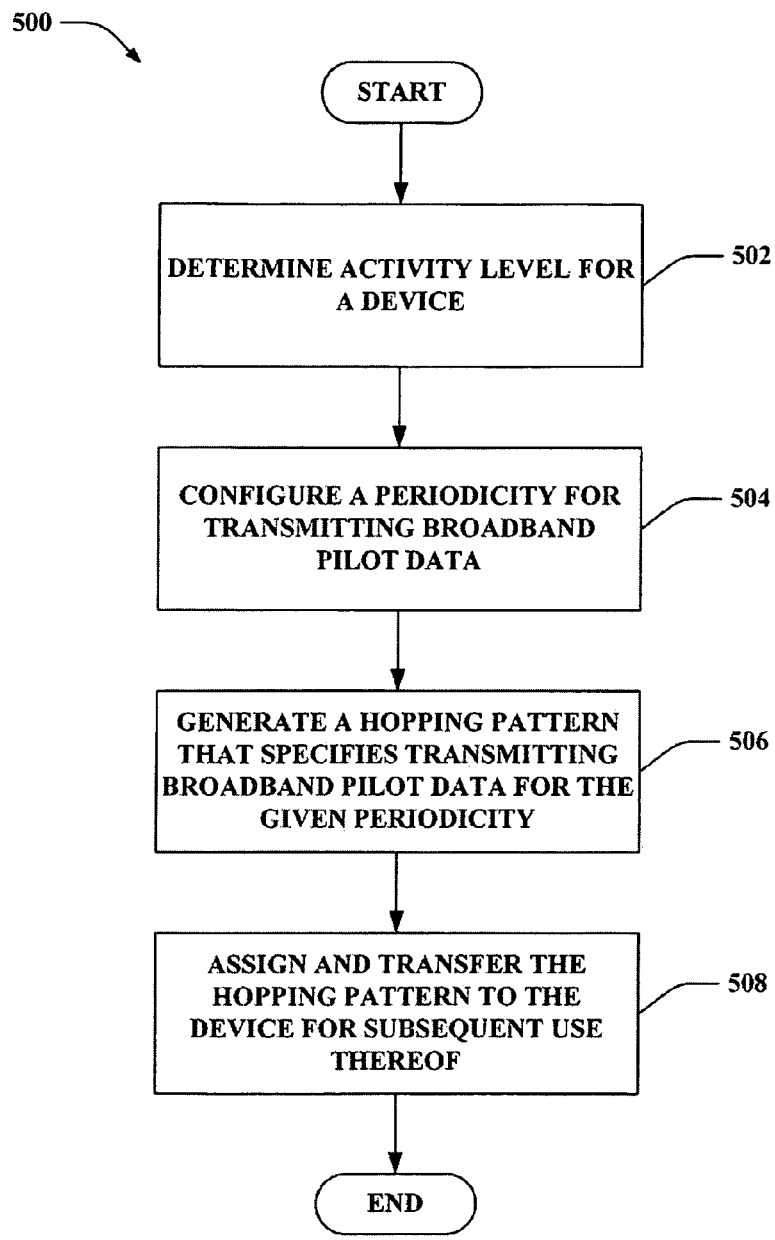
FIG. 5 is an illustration of an example methodology that facilitates generating a hopping pattern for transmitting broadband pilot signals.
Figure 6:
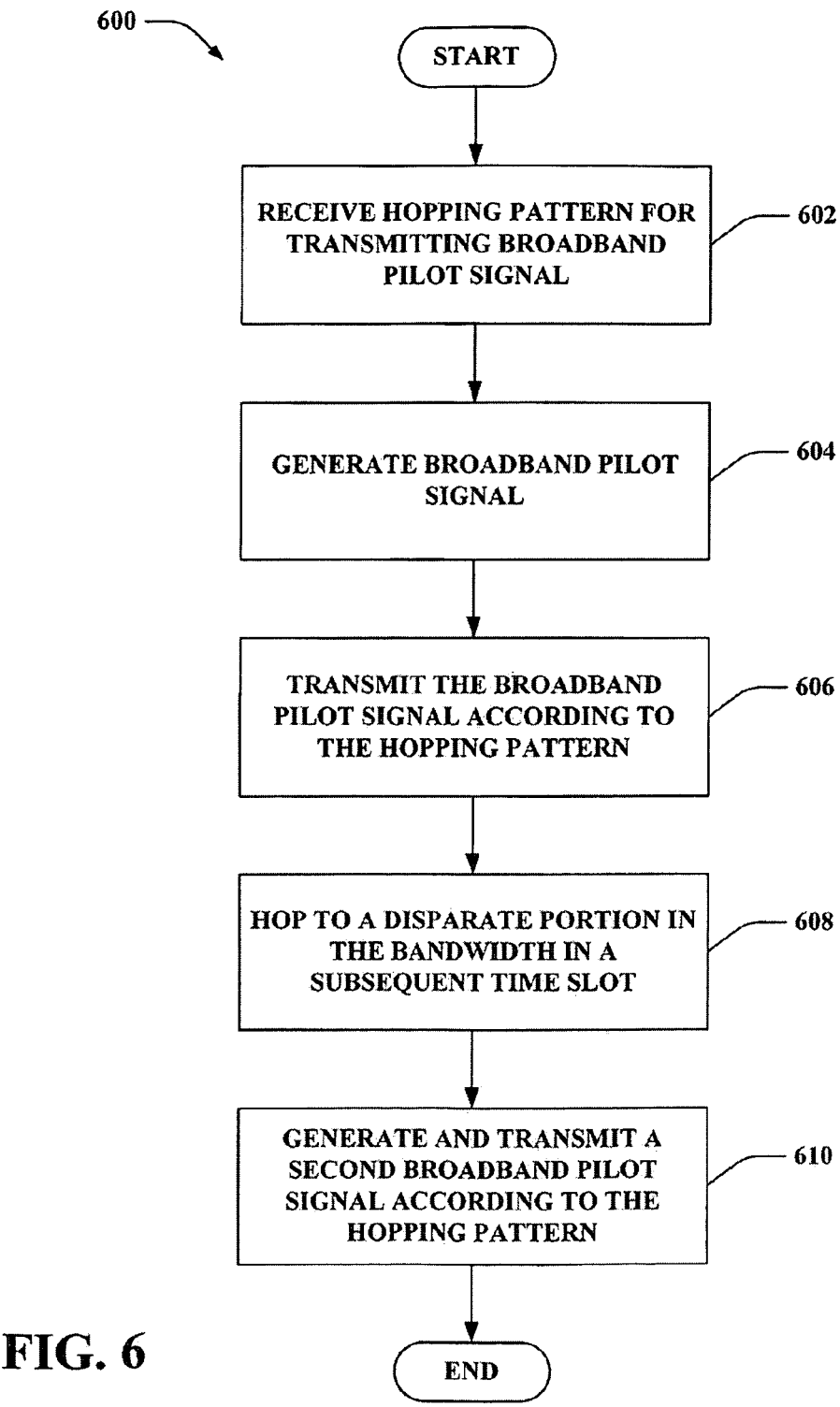
FIG. 6 is an illustration of an example methodology that utilizes a hopping pattern to transmit broadband pilot signals.

Referring to FIGS. 5-6, methodologies relating to providing broadband pilot signal hopping patterns are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a methodology 500 that facilitates generating broadband pilot signal hopping patterns to be utilized by devices in a wireless communications network. It is to be appreciated that the methodology 500 can allow bandwidth to be efficiently apportioned to facilitate transmitting broadband pilot information and additional data to/from a plurality of devices. At 502, an activity level can be determined for a device. As described previously, the activity level can be communicated by the device, inferred from device behavior (or type, configuration, etc.), received as information from a disparate device, and the like. The activity level can relate to communication scheduling needs as well. At 504, a periodicity for transmitting broadband pilot data can be configured for the device. As described, a portion of bandwidth in a given time period can be dedicated to broadband pilot information. Thus, a device can transmit broadband pilot information at each time period or it can skip time periods as shown supra. It is to be appreciated that some devices can communicate without requiring transmission of broadband pilot information (e.g., where a device is not very active). Moreover, it is to be appreciated that a periodicity configured for a device can be modified according to a change in activity level or due to other events, for example.

At 506, a hopping pattern can be generated that specifies transmitting broadband pilot data for the given periodicity. The hopping pattern can also specify hopping in frequency according to the periodicity. As described above, at each time period, the broadband pilot signal can be specified to hop to a disparate frequency resource block. The hopping pattern can also alternatively or additionally specify a cyclic shift and/or hopping within cyclic shifts. The hopping pattern can take on substantially any form as described supra where the hopping occurs over the specified periodicity. Moreover, the hopping pattern can be based at least in part on previously generated hopping patterns for disparate devices to minimize interference in communication. At 508, the hopping pattern can be assigned and transferred to the device. In this regard, the device can utilize the assigned hopping pattern, and the receiver of the broadband pilot information can know the pattern used.

Now referring to FIG. 6, a methodology 600 that facilitates utilizing a hopping pattern to transmit a broadband pilot signal is illustrated. At 602, a hopping pattern for transmitting a broadband pilot signal is received. The hopping pattern can be generated by a disparate device as described supra and can relate to an activity level of the receiving device. At 604, a broadband pilot signal can be generated for transmitting according to the hopping pattern. The data can comprise substantially any data that can be utilized by the receiver to ensure presence of the transmitting device, gather information related to the device or communications therewith, measure a SNR or channel quality, determine resources to be allocated to the device, determine one or more power control signals to transmit back to the device, and/or the like, for example.

At 606, the generated broadband pilot signal can be transmitted according to the hopping pattern. Thus, the signal can be broadcast on a specified frequency during a specific time period (such as by using a portion of an OFDM symbol) according to the hopping pattern. At 608, a disparate portion within the bandwidth can be hopped to in a subsequent time slot (e.g., a disparate resource block in a subsequent OFDM symbol dedicated to transmitting broadband pilot information). At 610, a second broadband pilot signal can be generated and transmitted according to the hopping pattern. In this regard, the broadband pilot signal can utilize an entire bandwidth reserved for transmitting broadband pilot data over a period of time.

It will be appreciated that, in accordance with one or more aspects described herein, inferences can be made regarding determining a hopping pattern to assign to one or more devices in a wireless communications network as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to determining a hopping pattern for one or more devices. For example, a hopping pattern can be generated based on inferences made regarding past assigned hopping patterns, such as the manner in which the hopping pattern is defined to minimize interference with the hopping patterns in effect for the disparate devices. Additionally, inferences can be made with respect to determining activity levels for devices and/or discerning a periodicity for transmitting broadband pilot signals according to the hopping pattern based on the activity. Furthermore, inferences can be made from the broadband pilot signal with respect to allocating channel resources and/or requesting additional or less transmission power from a transmitting device.

Figure 7:
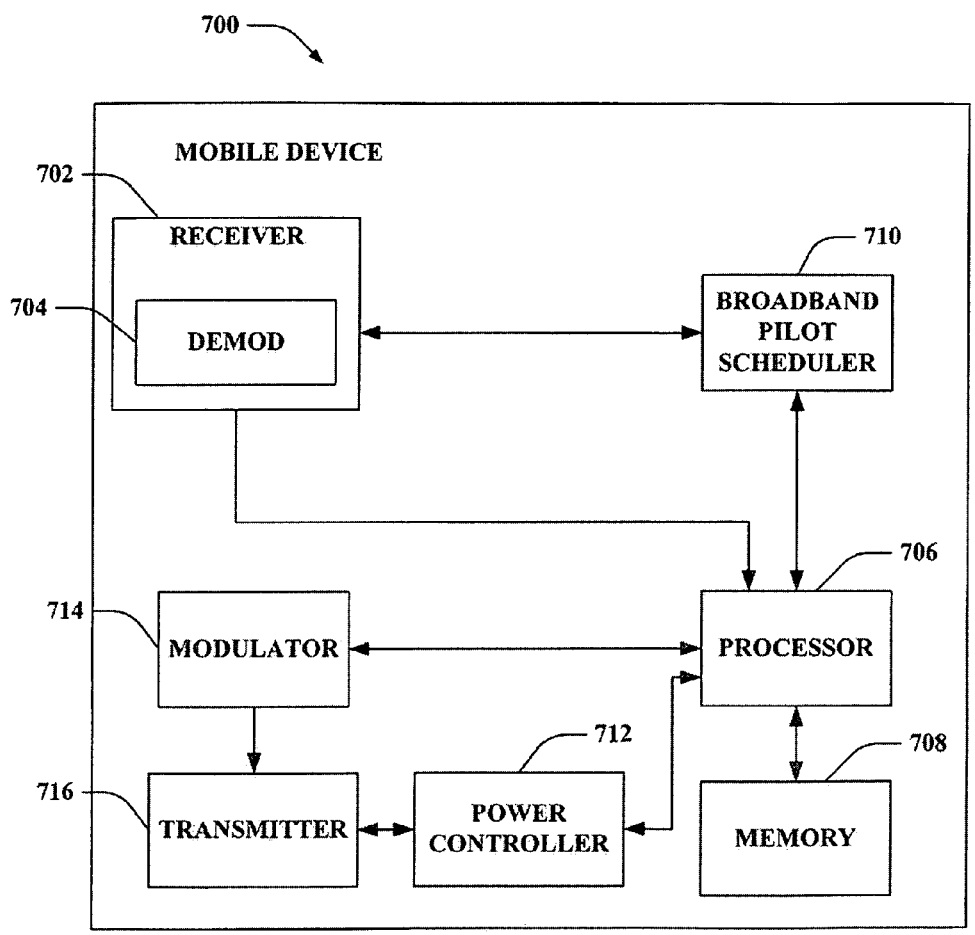
FIG. 7 is an illustration of an example mobile device that facilitates transmitting broadband pilot data according to a hopping pattern.

FIG. 7 is an illustration of a mobile device 700 that facilitates transmitting broadband pilot signals according to one or more hopping patterns and controlling power for transmission thereof. Mobile device 700 comprises a receiver 702 that receives a signal from, for instance, a receive antenna (not shown), performs typical actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 708 of the subject systems and methods is intended to comprise, without being limited to, these and any other suitable types of memory.

Processor 706 can further be operatively coupled to a broadband pilot scheduler 710 that can generate and schedule broadband pilot signals to be transmitted according to one or more hopping patterns as described supra, for instance. In one example, the mobile device 700 can receive a broadband pilot hopping pattern from a device to which it is communicating (such as a base station, for example). The hopping pattern can specify where and when (e.g., frequency slots for given time slot intervals) to send broadband pilot data; the time slot intervals can be determined based on scheduling needs and/or an activity level of the mobile device 700 in one example. The pattern can specify to hop across frequencies over time periods, and the broadband pilot scheduler 710 can utilize this information to appropriately schedule transmission of the data.

Mobile device 700 still further comprises a modulator 714 and transmitter 716 that respectively modulate and transmit signals to, for instance, a base station, another mobile device, etc. The processor 706 can also be operatively coupled to a power controller 712 that can increase, reduce, and/or configure a power level utilized by the transmitter 716 to transmit the signals. According to an example, the mobile device 700 can receive power control signals from a disparate device based at least in part on the transmitted broadband pilot signal, and the power controller 712 can adjust the transmission power based at least in part on the received power control signal. Although depicted as being separate from the processor 706, it is to be appreciated that the broadband pilot scheduler 710, power controller 712, demodulator 704, and/or modulator 714 can be part of the processor 706 or multiple processors (not shown).

Figure 8:
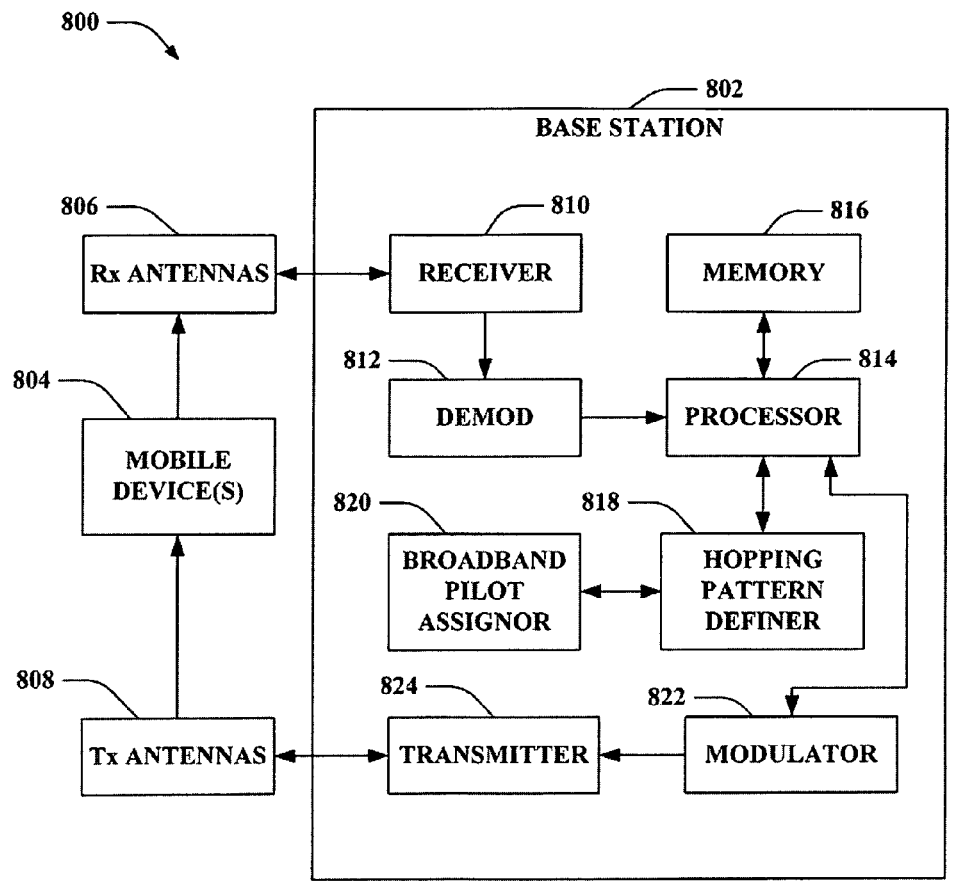
FIG. 8 is an illustration of an example system that facilitates creating and assigning hopping patterns for broadband pilot signals.

FIG. 8 is an illustration of a system 800 that facilitates defining and assigning broadband pilot signal hopping patterns as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a hopping pattern definer 818 that can generate hopping patterns for broadband pilot signals transmitted by mobile devices 804. Moreover, the processor 814 can be coupled to a broadband pilot assignor 820 that can assign the hopping pattern to the mobile devices 804 to receive the broadband pilot signals at desired times and frequencies.

According to an example, the base station 802 can receive communication from one or more mobile devices 804 and can determine an activity level for the device 804 based on the communication. Using the activity level, the hopping pattern definer (or another component/processor 814) can determine a periodicity for transmitting broadband pilot data. It is to be appreciated, as mentioned, that not all devices 804 are required to transmit broadband pilot data (e.g., devices of low activity). Subsequently, a hopping pattern can be defined by the hopping pattern definer 818 as described supra; specifically, a pattern can be defined to hop across frequency resource blocks over time and/or hop cyclic shifts of patterns, etc., and the pattern can be defined based at least in part on previously generated and assigned patterns, for example. The broadband pilot assignor 820 can assign the broadband pilot hopping pattern to a respective mobile device 804. Subsequently, the mobile device 804 can utilize the pattern to transmit broadband pilot data to the base station 802, and the base station 802 can utilize the data to determine resource allocation for the mobile device 804 and/or to control a power level thereof. Furthermore, although depicted as being separate from the processor 814, it is to be appreciated that the hopping pattern definer 818, broadband pilot assignor 820, demodulator 812, and/or modulator 822 can be part of the processor 814 or multiple processors (not shown).

Figure 9:
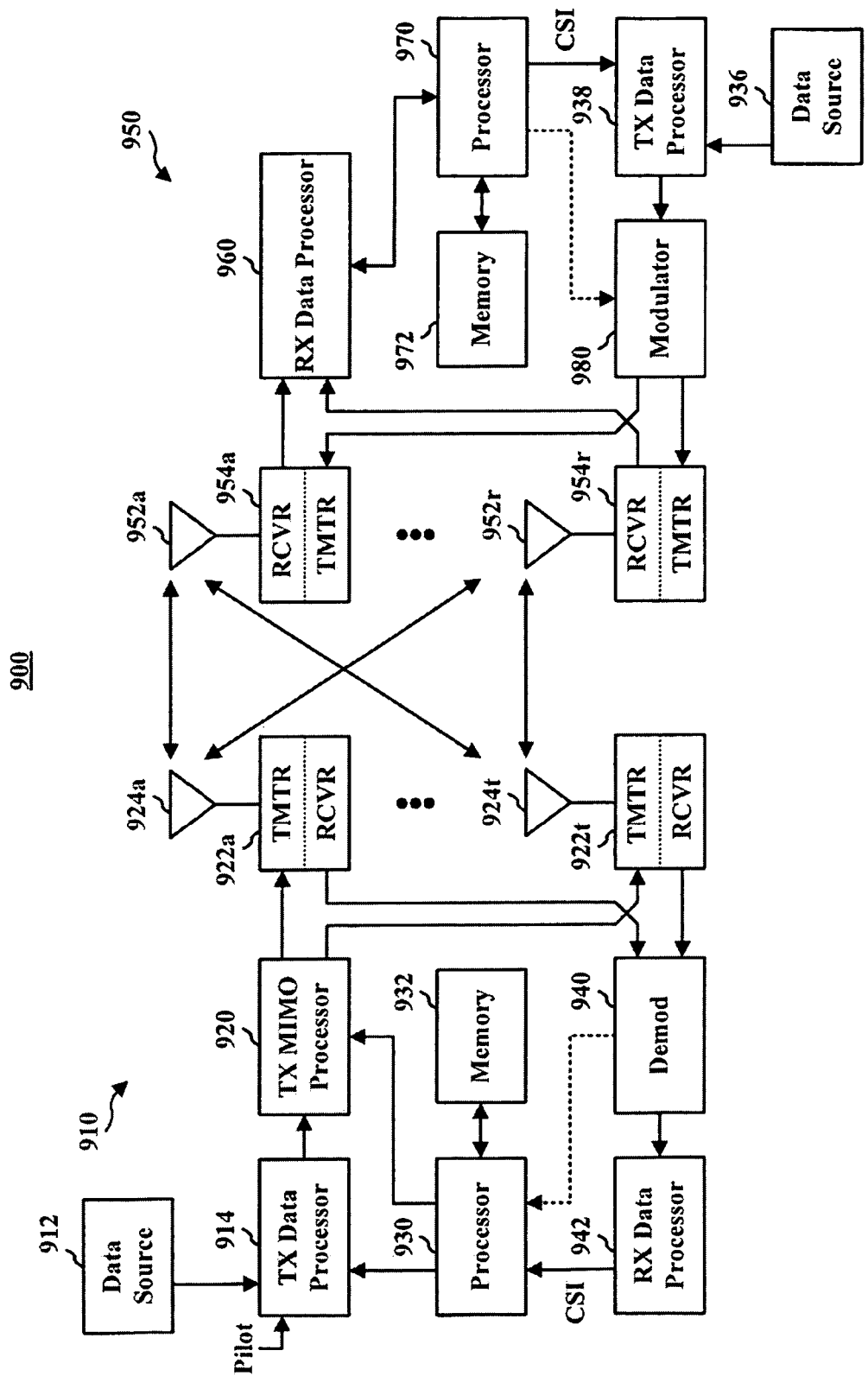
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
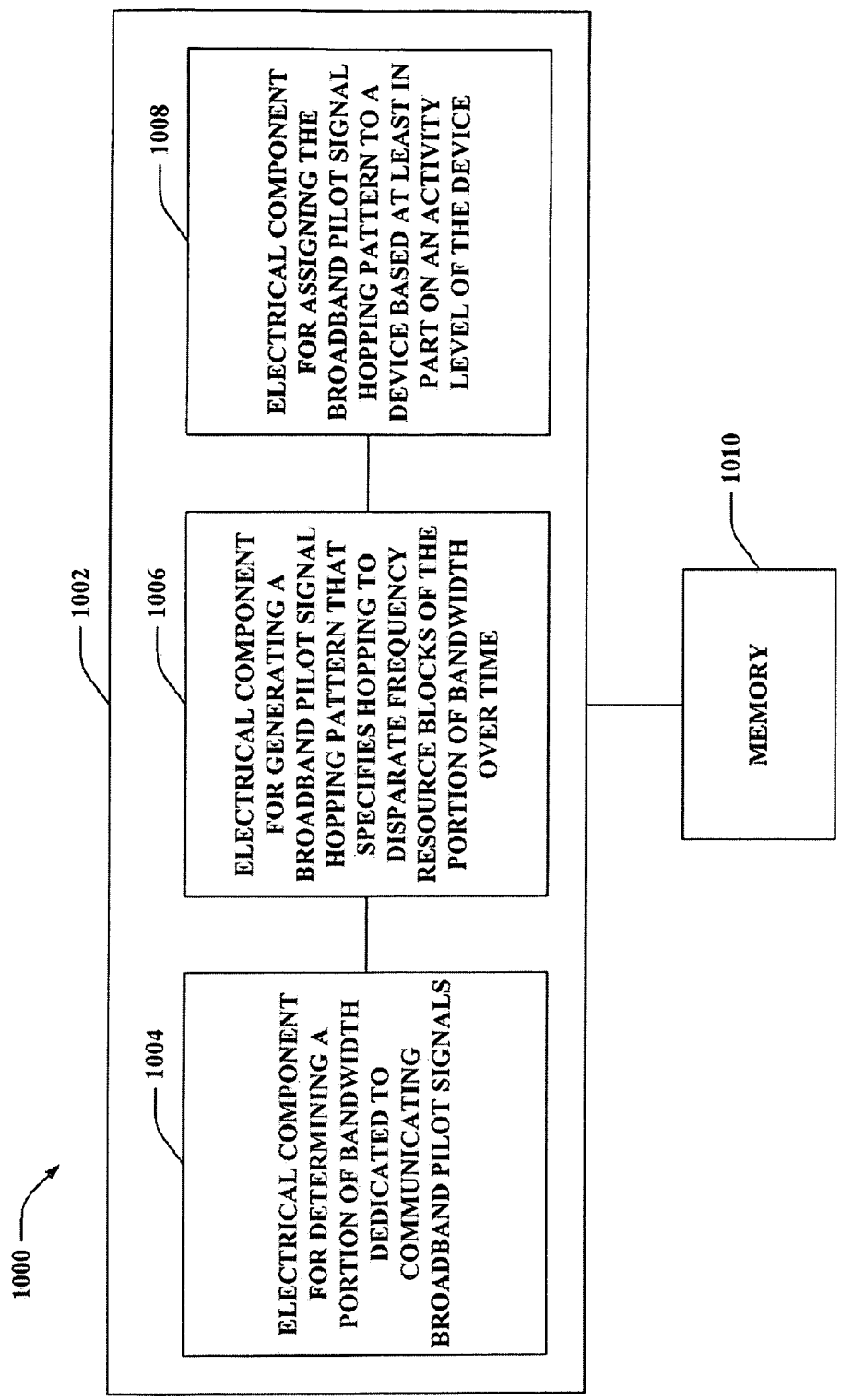
FIG. 10 is an illustration of an example system that generates and assigns broadband pilot signal hopping patterns.

With reference to FIG. 10, illustrated is a system 1000 that creates a broadband pilot signal hopping pattern and assigns the pattern to a device. For example, system 1000 can reside at least partially within a base station, mobile device, etc. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for determining a portion of bandwidth dedicated to communicating broadband pilot signals 1004. For example, the bandwidth can be separated into units of frequency over time, such as in an OFDMA system. In this example, an OFDM symbol for a given collection of symbols, which make up a time slot, can be reserved for transmitting broadband pilot data. Further, logical grouping 1002 can comprise an electrical component for generating a broadband pilot signal hopping pattern that specifies hopping to disparate frequency resource blocks of the portion of bandwidth over time 1006. For example, for a given time period, the hopping pattern can specify utilizing disparate portions of the dedicated broadband pilot signal bandwidth. In one example, the portions of bandwidth can be hopped sequentially, such as in a loop, or substantially any other pattern. In another example, the portions of bandwidth can be hopped, and cyclic shifts of the generated pattern can be hopped as well. Moreover, logical grouping 1002 can comprise an electrical component for assigning the broadband pilot signal hopping pattern to a device based at least in part on an activity level of the device 1008. Thus, the hopping pattern can have a specified periodicity for transmitting broadband pilot signals, and devices requiring increased scheduling can be assigned hopping patterns with greater periodicity than those requiring less scheduling according to the activity level of the device. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
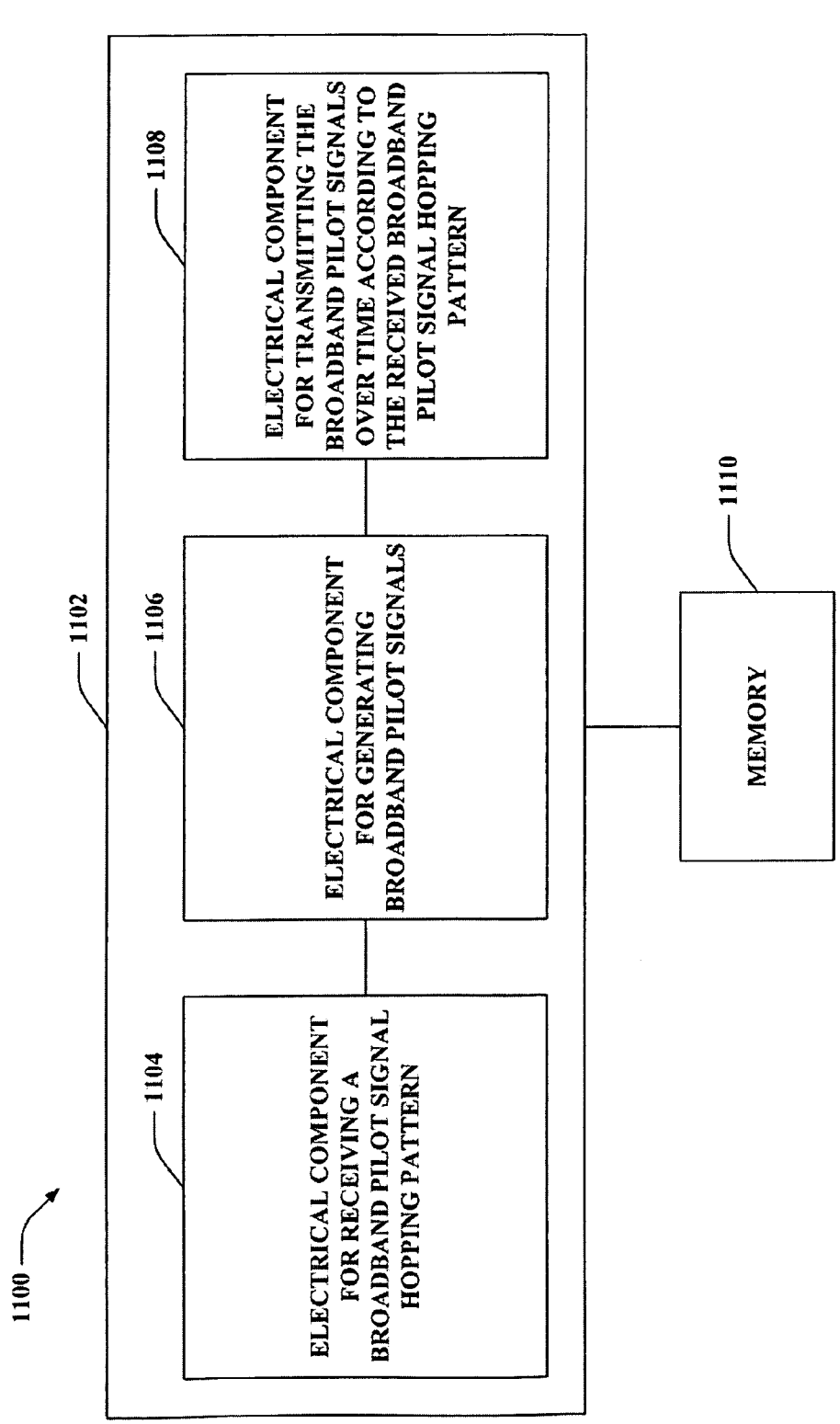
FIG. 11 is an illustration of an example system that transmits broadband pilot signals.

Turning to FIG. 11, illustrated is a system 1100 that communicates broadband pilot signals, according to a hopping pattern, in a wireless communications network. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate communicating broadband pilot signals according to a hopping pattern. Logical grouping 1102 can include an electrical component for receiving a broadband pilot signal hopping pattern 1104. The broadband pilot signal hopping pattern can be assigned by a base station or other device, for example. Furthermore, the hopping pattern can be assigned based on an activity level, for example, where the hopping pattern can have a periodicity for transmitting broadband pilot signals according to the activity level. Moreover, logical grouping 1102 can include an electrical component for generating broadband pilot signals 1106. The signals can be substantially any form of transmitted data, such as single bits structures, etc., that are modulated across the assigned frequency. Further, logical grouping 1102 can comprise an electrical component for transmitting the broadband pilot signals over time according to the received broadband pilot signal hopping pattern 1108. Thus, in a given time period, a portion of frequency can be utilized that is different from that utilized in a previous time period. This provides for utilization of an entire portion of bandwidth dedicated for transmitting broadband pilot data over time. Additionally, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   determining a portion of available bandwidth for transmitting a broadband pilot signal by a device;
   determining a periodicity of transmitting the broadband pilot signal by the device;
   determining a broadband pilot signal hopping pattern for the device that specifies hopping across the portion of available bandwidth according to the periodicity of transmitting the broadband pilot signal by the device; and
   assigning the broadband pilot signal hopping pattern to the device.

2. The method of claim 1, further comprising:
   receiving the broadband pilot signal from the device according to the broadband pilot signal hopping pattern assigned to the device.

3. The method of claim 2, further comprising:
   scheduling communication resources for the device based at least in part on the received broadband pilot signal.

4. The method of claim 2, further comprising:
   generating a power control signal for the device based at least in part on the received broadband pilot signal.

5. The method of claim 1, wherein the broadband pilot signal hopping pattern specifies hopping across resource blocks of the portion of available bandwidth.

6. The method of claim 5, wherein the broadband pilot signal hopping pattern specifies hopping sequentially across substantially all of the resource blocks of the portion of available bandwidth.

7. The method of claim 5, wherein the broadband pilot signal hopping pattern specifies hopping across cyclic shifts of the broadband pilot signal hopping pattern.

8. The method of claim 1, wherein the periodicity of transmitting the broadband pilot signal by the device is determined based at least in part on an activity level of the device.

9. The method of claim 1, wherein the broadband pilot signal hopping pattern is non-overlapping with broadband pilot signal hopping patterns assigned to other devices communicating with a same base station as the device.

10. A wireless communications apparatus, comprising:
    at least one processor configured to:
       determine a portion of available bandwidth for transmitting a broadband pilot signal by a device,
       determine a periodicity of transmitting the broadband pilot signal by the device,
       determine a broadband pilot signal hopping pattern for the device that specifies hopping across the portion of available bandwidth according to the periodicity of transmitting the broadband pilot signal by the device, and
       assign the broadband pilot signal hopping pattern to the device; and
    a memory coupled to the at least one processor.

11. The wireless communications apparatus of claim 10, wherein the at least one processor is further configured to receive the broadband pilot signal from the device according to the broadband pilot signal hopping pattern.

12. The wireless communications apparatus of claim 11, wherein the at least one processor is further configured to allocate resources to the device, or generate a power control signal for the device, or both, based at least in part on the received broadband pilot signal.

13. The wireless communications apparatus of claim 10, wherein the broadband pilot signal hopping pattern specifies hopping across resource blocks of the portion of available bandwidth.

14. The wireless communications apparatus of claim 10, wherein the broadband pilot signal hopping pattern specifies hopping across cyclic shifts of the broadband pilot signal hopping pattern.

15. The wireless communications apparatus of claim 10, wherein the periodicity of transmitting the broadband pilot signal by the device is determined based at least in part on an activity level of the device.

16. The wireless communications apparatus of claim 10, wherein the broadband pilot signal hopping pattern hops across resource blocks of the portion of available bandwidth.

17. A wireless communications apparatus, comprising:
means for determining a portion of available bandwidth for transmitting a broadband pilot signal by a device;
means for determining a periodicity of transmitting the broadband pilot signal by the device;
means for determining a broadband pilot signal hopping pattern for the device that specifies hopping across the portion of available bandwidth according to the periodicity of transmitting the broadband pilot signal by the device; and
means for assigning the broadband pilot signal hopping pattern to the device.

18. The wireless communications apparatus of claim 17, further comprising means for scheduling resources to the device based on the broadband pilot signal received from the device according to the broadband pilot signal hopping pattern.

19. The wireless communications apparatus of claim 17, wherein the broadband pilot signal hopping pattern specifies hopping across resource blocks of the portion of available bandwidth.

20. The wireless communications apparatus of claim 17, wherein the periodicity of transmitting the broadband pilot signal by the device is determined based at least in part on an activity level of the device.

21. The wireless communications apparatus of claim 17, wherein the broadband pilot signal hopping pattern specifies hopping across cyclic shifts of the broadband pilot signal hopping pattern.

22. A computer program product, comprising:
a non-transitory computer-readable medium comprising:
code for causing at least one computer to determine a portion of available bandwidth for transmitting a broadband pilot signal by a device;
code for causing the at least one computer to determine a periodicity of transmitting the broadband pilot signal by the device;
code for causing the at least one computer to determine a broadband pilot signal hopping pattern for the device that specifies hopping across the portion of available bandwidth according to the periodicity of transmitting the broadband pilot signal by the device; and
code for causing the at least one computer to assign the broadband pilot signal hopping pattern to the device.

23. The computer program product of claim 22, wherein the broadband pilot signal hopping pattern specifies hopping across cyclic shifts of the broadband pilot signal hopping pattern.

24. A method, comprising:
receiving a broadband pilot signal hopping pattern assigned to a device, wherein the broadband pilot signal hopping pattern is determined based on a portion of available bandwidth for transmitting a broadband pilot signal by the device and further based on a periodicity of transmitting the broadband pilot signal by the device; and
transmitting the broadband pilot signal according to the broadband pilot signal hopping pattern.

25. The method of claim 24, wherein the broadband pilot signal hopping pattern is received from a first base station and is different from a second broadband pilot signal hopping pattern previously received from a second base station.

26. The method of claim 24, wherein the portion of available bandwidth comprises first and second resource blocks, and wherein the transmitting the broadband pilot signal comprises
transmitting the broadband pilot signal on the first resource block in a first time interval, and
transmitting the broadband pilot signal on the second resource block in a second time interval, the second resource block is adjacent to the first resource block.

27. The method of claim 24, further comprising:
hopping to different resource blocks in the portion of available bandwidth over time according to the broadband pilot signal hopping pattern.

28. The method of claim 24, further comprising:
hopping to a cyclic shift of the broadband pilot signal hopping pattern.

29. The method of claim 24, further comprising:
receiving a power control signal determined based at least in part on the transmitted broadband pilot signal.

30. A wireless communications apparatus, comprising:
at least one processor configured to:
receive a broadband pilot signal hopping pattern assigned to a device, wherein the broadband pilot signal hopping pattern is determined based on a portion of available bandwidth for transmitting a broadband pilot signal by the device and further based on a periodicity of transmitting the broadband pilot signal by the device, and
transmit the broadband pilot signal according to the broadband pilot signal hopping pattern; and
a memory coupled to the at least one processor.

31. The wireless communications apparatus of claim 30, wherein the at least one processor is further configured to hop to different resource blocks in the portion of available bandwidth over time according to the broadband pilot signal hopping pattern.

32. The wireless communications apparatus of claim 30, wherein the broadband pilot signal hopping pattern specifies hopping across a plurality of cyclic shifts of the broadband pilot signal hopping pattern.

33. The wireless communications apparatus of claim 30, wherein the periodicity of transmitting the broadband pilot signal by the device is determined based at least in part on an activity level of the device.

34. The wireless communications apparatus of claim 30, wherein the at least one processor is further configured to receive a power control signal determined based on the broadband pilot signal, and to adjust transmit power for subsequent transmissions based at least in part on the power control signal.

35. A wireless communications apparatus, comprising:
means for receiving a broadband pilot signal hopping pattern assigned to a device, wherein the broadband pilot signal hopping pattern is determined based on a portion of available bandwidth for transmitting a broadband pilot signal by the device and further based on a periodicity of transmitting the broadband pilot signal by the device; and
means for transmitting the broadband pilot signal according to the broadband pilot signal hopping pattern.

36. The wireless communications apparatus of claim 35, wherein the broadband pilot signal hopping pattern specifies hopping across resource blocks of the portion of available bandwidth.

37. The wireless communications apparatus of claim 36, wherein the broadband pilot signal hopping pattern specifies hopping sequentially across substantially all of the resource blocks of the portion of available bandwidth.

38. The wireless communications apparatus of claim 35, wherein the broadband pilot signal hopping pattern specifies hopping across cyclic shifts of the broadband pilot signal hopping pattern.

39. The wireless communications apparatus of claim 35, wherein the periodicity of transmitting the broadband pilot signal is determined according to an activity level of the device.

40. The wireless communications apparatus of claim 35, further comprising
means for receiving a power control signal determined based at least in part on the transmitted broadband pilot signal; and
means for controlling transmit power for subsequent transmissions based at least in part on the power control signal.

41. A computer program product, comprising:
a non-transitory computer-readable medium comprising:
code for causing at least one computer to receive a broadband pilot signal hopping pattern assigned to a device, wherein the broadband pilot signal hopping pattern is determined based on a portion of available bandwidth for transmitting a broadband pilot signal by the device and further based on a periodicity of transmitting the broadband pilot signal by the device; and
code for causing the at least one computer to transmit the broadband pilot signal according to the broadband pilot signal hopping pattern.

42. The computer program product of claim 41, further comprising
code for causing the at least one computer to hop to different resource blocks in the portion of available bandwidth over time according to the broadband pilot signal hopping pattern.

* * * * *